April 7, 1959

H. L. DAVIS 2,880,787

SEAT SPRINGS

Filed Feb. 1, 1954

INVENTOR.
HARLAN L. DAVIS
BY

ATTORNEYS.

April 7, 1959 H. L. DAVIS 2,880,787
SEAT SPRINGS

Filed Feb. 1, 1954 2 Sheets-Sheet 2

INVENTOR.
HARLAN L. DAVIS
BY
ATTORNEYS.

2,880,787

SEAT SPRINGS

Harlan L. Davis, Adrian, Mich., assignor to Stubnitz-Greene Spring Corporation, Adrian, Mich., a corporation of Michigan Application February 1, 1954, Serial No. 407,449

1 Claim. (Cl. 155—179)

This invention relates to seat cushions, particularly seat back spring cushions. It is the object of the present invention to provide a seat back cushion which can be used to provide a narrow seat back to enable the rear seat to be moved forward, thereby providing a more comfortable ride for the occupant of the rear seat by taking him forward in the car to a position more comfortable forward of the axle. Furthermore, it permits the lowering of the car roof by reason of positioning the rear seat occupant more forward with respect to the arched rear portion of the roof.

The seat back springs that are now much in vogue are the so-called zigzag springs. These are cheaper than the old-fashioned seat springs which were of the hourglass type or were cylindrical and enclosed in pockets known as the Marshall spring. The zigzag was adopted largely because it takes less wire and is therefore cheaper and has advantages from the standpoint of shipping and assembly where the body is assembled. It can be shipped knocked down and assembled on the job. On the other hand it has the disadvantage of being less comfortable because it has to be made stiff to prevent its being projected into the recess in the front seat back which is assigned for the rear seat rider's knees or feet.

Maurice Stubnitz has designed a spring seat which does not have the bad features of the zigzag spring seat and which can compete with the zigzag spring seat in economy of manufacture and which can be shipped knocked down and assembled on the body building job. This seat spring is described and claimed in a Stubnitz Patent 2,642,292, issued June 23, 1953. The Stubnitz spring seat employs the conical load-supporting springs supported on a mat formed by stringers which are made of spring wire which requires a high carbon steel ranging from .55 to .80 carbon. This wire cannot be satisfactorily welded to the frames or at the intersections. These stringers are also provided with so-called jack springs at one or both ends of the cross stringers. High carbon steel is more expensive than the low carbon steels and these jack springs or safety pin spring legs are difficult to manufacture and require special machinery for that purpose such as is described and claimed in the Medendorp application, Serial No. 214,942, filed March 10, 1951, now Patent No. 2,677,398, issued May 4, 1954.

I have discovered that a lower carbon steel can be advantageously used for the stringers and that the jack spring or safety pin type spring ends of the stringers can be eliminated. This is advantageous because it narrows the cushion to enable the rear seat to be moved forward and it also very considerably lowers the manufacturing cost of the assembly by reason of using a cheaper steel and also eliminating the cost of manufacturing of the jack spring ends of the cross stringers. I have found that if the mat wires are made of steel of low carbon content such as basic steel which is .08 to .10 carbon that the mat itself will yield in local areas and consequently the safety pin type ends for the cross stringers are not needed.

Another feature of my improved seat spring is the shape of the cross stringer ends, that is, they have arched feet. These stringers can be assembled with the arched feet being threaded into tunnels struck out of the seat frame. After all of the cross stringers have been threaded in place one at a time by tipping the stringer to feed the curved foot into the tunnel, they are all locked and anchored firmly in place when the longitudinal stringers are laid over the cross stringers and the conical springs screwed into the mat at the stringer intersections. This is a simple, cheap, ingenious arrangement for anchoring the stringers in place so that they cannot shift in the tunnels. This arrangement accomplishes the same goal that is accomplished in the cushion described and claimed in the Kruszona Patent 2,657,738 and the Williams Patent 2,526,184. Referring to the drawings:

Figure 1:
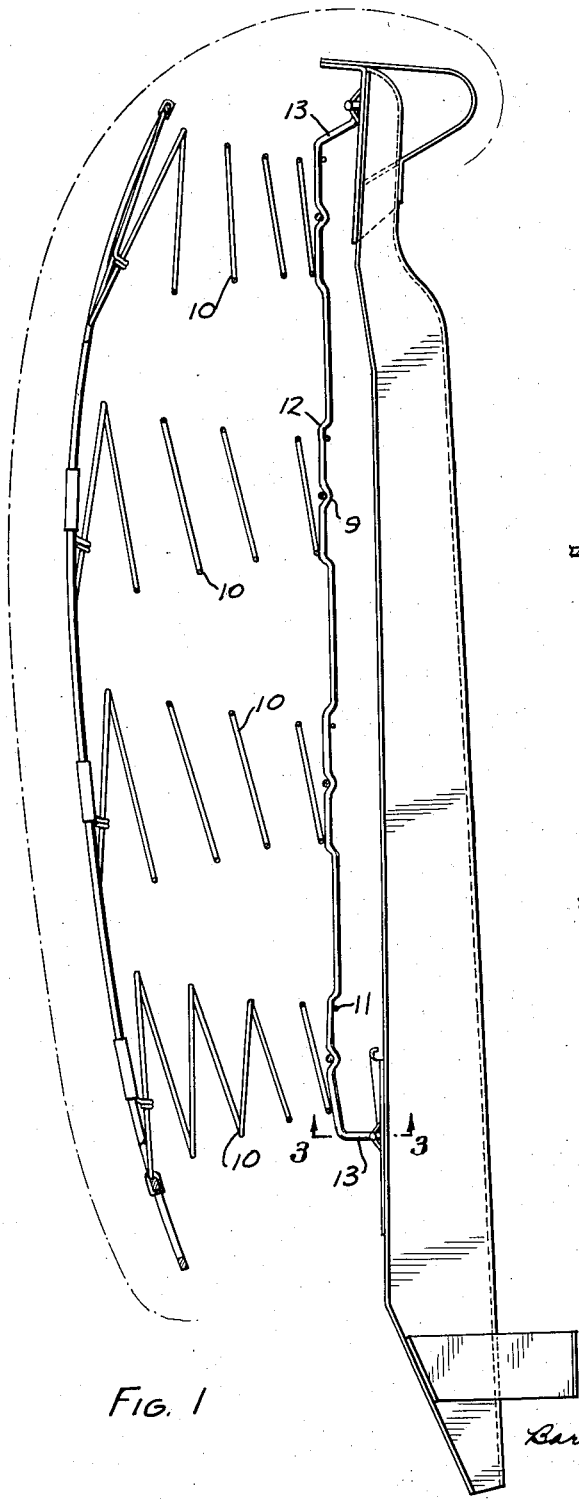
Fig. 1 is an end elevation of the seat back spring.
Figure 2:
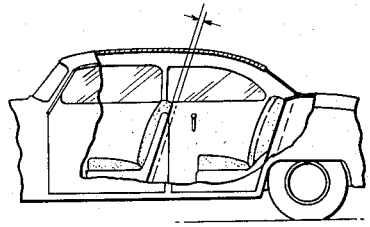
Fig. 2 is a miniature fragmentary view of a body showing how the rear seat can be moved forward by reason of the space saving shown by the lines with the arrows and afforded by my improved spring seat assembly.
Figure 3:
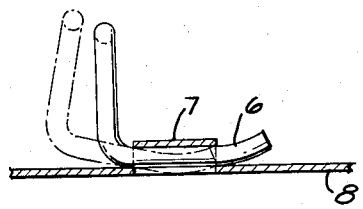
Fig. 3 shows how the hooked foot of the cross stringer is threaded into the tunnel struck out of the seat frame.
Figure 6:
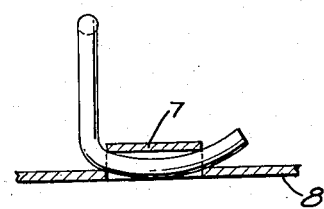
Fig. 6 is a detail view of a modified form of stringer end with a full arch.
Figure 4:
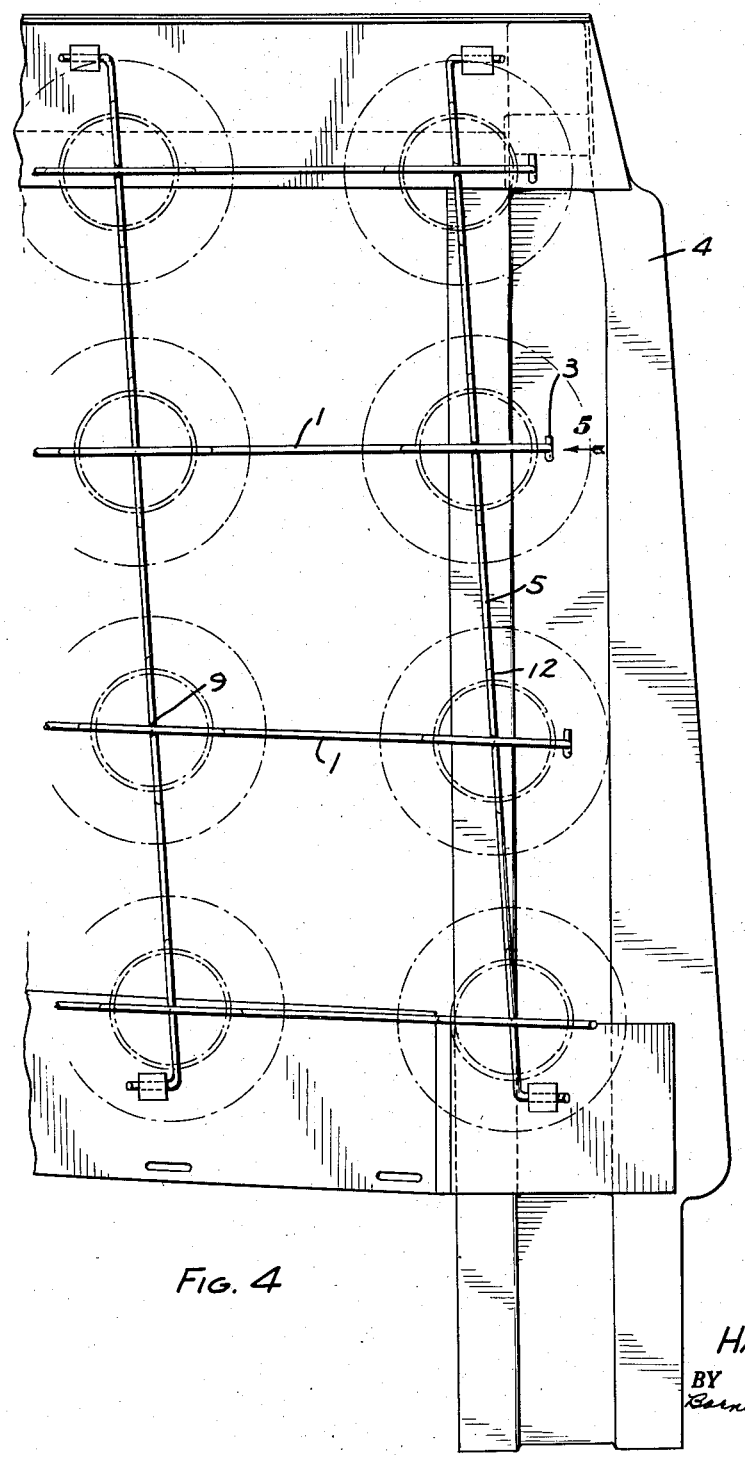
Fig. 4 is a fragmentary front elevation of the seat back spring.
Figure 5:
Fig. 5 is a detail of the end of one of the longitudinal stringers.

The cross stringers 5 are first assembled into the seat frame by means of the shallow arched ends or feet 6 being threaded into the tunnels 7 struck out from the horizontal frame members 8 in the way shown in Fig. 3. When all the cross stringers have been placed on the frame by means of this tilting action shown in Fig. 3 then the longitudinal stringers are hooked into slots 3 of the vertical frame members and laid over the cross stringers as shown in Figs. 1 and 4. The cross stringers are provided with dips 9 which seat the intersecting longitudinal stringers 1. These cross stringers may be spot welded at the intersections if desired, but this is not necessary. The short, coiled load-supporting springs 10 are screwed into the mat by twisting or screwing action, the lower end 11 of the load-supporting springs resting under the elevations 12 of the cross stringers. This elevation forms a recess or seat to take the screwed-in portion of the lowermost coil. When the short conical springs are screwed into the intersections, this locks the stringer wires together to form a mat and when the stringers cannot move laterally the ends or the feet of the cross stringers cannot be tilted to permit the end to move or retreat from the tunnel; consequently, in this simple way the stringers are firmly anchored in the tunnels without the aid of an additional member such as the struck out nubs or shoulders of the Kruszona and Williams patents. With the full arched end as shown in Fig. 6 the stringers cannot move in or out of the tunnels when the stringers are locked together.

The mat being made of low carbon steel may not only be welded at the intersections but the ends may be welded to the frame members if this is desired in place of the tunnels and arched feet.

One of the great advantages is that I have found that the mat is not stiff and non-yielding but very flexible at the local areas so that it can give locally without the whole mat having to move. Therefore, with this local flexibility the jack or safety pin type springs are not required and consequently there is a cost saving and there is a considerable saving in the depth of the spring assembly. A double-deck spring is not required such as shown and described in the above mentioned Stubnitz patent. The assembly need not have legs or risers 13 except where it is desirable to have a recess in the seat back to accommodate the rear seat occupant's knees.

What I claim is:

The method of building a seat frame assembly of cross stringers and forming turned-down legs having right angularly coiled conical load-supporting springs screwed into the stringers at their intersections and fastening the same to the seat frame which has tunnels projecting therefrom, which method consists of arching the end portions or feet of the cross stringers, then threading the arched end portions of the stringers into the tunnels by tilting each cross stringer when threading it in place, then laying the longitudinal stringers over the cross stringers and locking these together by screwing the load-supporting springs into the mat formed by the stringers at the intersections of the stringers.

References Cited in the file of this patent

UNITED STATES PATENTS

| | | |
|---|---|---|
| 871,244 | Smith et al. | Nov. 19, 1907 |
| 2,061,725 | Wesley | Nov. 24, 1936 |
| 2,440,001 | Blumensaadt | April 20, 1948 |
| 2,622,662 | Caughey | Dec. 23, 1952 |
| 2,642,929 | Stubnitz | June 23, 1953 |
| 2,642,930 | Stubnitz | June 23, 1953 |
| 2,649,897 | Stubnitz | Aug. 25, 1953 |